United States Patent
Iroaga et al.

(12) 
(10) Patent No.: US 6,700,719 B2
(45) Date of Patent: Mar. 2, 2004

(54) PREAMP READER DESIGN FOR HIGH RESISTANCE READ HEADS

(75) Inventors: Echere Iroaga, Scarborough (CA); Ashish Manjreka, Dallas, TX (US); Indumini Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 201 days.

(21) Appl. No.: 09/875,703

(22) Filed: Jun. 6, 2001

(65) Prior Publication Data

US 2002/0191315 A1 Dec. 19, 2002

(51) Int. Cl.[7] ............... G11B 5/09; G11B 5/03
(52) U.S. Cl. ............... 360/46; 360/66; 360/67
(58) Field of Search ............... 360/46, 47, 66

(56) References Cited

U.S. PATENT DOCUMENTS

| | | | | |
|---|---|---|---|---|
| 5,856,891 A | * | 1/1999 | Ngo | 360/66 |
| 6,307,699 B1 | * | 10/2001 | Patti | 360/66 |
| 6,532,127 B1 | * | 3/2003 | Ranmuthu et al. | 360/66 |

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A differential circuit to read differential data from a disk by a voltage bias includes a read circuit to read the differential data from the disk by maintaining the voltage bias by a first transistor and a second transistor, the first transistor being positioned in a first current path to maintain a first current and the second transistor being positioned in a second current path to maintain a second current. The first current is approximately equal to the second current.

10 Claims, 4 Drawing Sheets

PREAMP READER DESIGN FOR HIGH RESISTANCE READ HEADS

FIELD OF THE INVENTION

The present invention relates to disk circuits and more particularly to a method and apparatus for reading information from a magnetic disk by biasing a read head.

BACKGROUND OF THE INVENTION

Conventional magnetic storage devices include magnetic transducer or "head" suspended in close proximity to a recording medium, for example a magnetic disk, having a plurality of concentric tracks. The transducer is supported by an air-bearing slider mounted to a flexible suspension. The suspension, in turn, is attached to a positioning actuator. During normal read operation, relative motion is provided between the head and the recording medium as the actuator dynamically positions the head over the desired track. The relative movement provides an airflow along the surface of the slider facing the medium, creating a lifting force. The lifting force is counterbalanced by a predetermined suspension force so that the slider is supported on a cushion of air. Airflow enters the leading end of the slider and exits from the trailing head. This air is used to prevent the head from contacting the disk, which would result in damage.

Writing data is typically performed by applying a current to the sensor or the head so that a magnetic field is induced and an adjacent magnetic-permeable core, with the core transmitting a magnetic signal across any spacing and protective coating of the disk to magnetize a small pattern or digital bit of the medium within the disk.

Reading of the information in the disk is performed by sensing a change in magnetic field of the core as the transducer passes over bits in the disk. The changing magnetic field induces a voltage or current in the inductive coupled coil. Alternatively, reading of the information may be accomplished by employing a magneto-resistive (MR) sensor, which has a resistance that varies as a function of the magnetic field adjacent to the sensor. In order to increase the amplitude and resolution of the reading bits, the MR sensor is typically positioned on the slider as close to the disk as possible. Connected to these heads are sensors are read circuits which amplify the recorded data and eliminate noise.

However, recently, some of the manufacturers of these MR sensors have switched from MR heads, which employ a constant current source to MR heads, which employ a constant voltage source. Thus, there is a need for a read circuit, which provides a constant voltage source. Recently, the hard disk drive (HDD) industry has been moving toward high resistance heads on the order of between 50 and 150 ohm read heads. Previous pre-amp circuit designs were insufficient for these high resistance heads due to poor common mode rejection (CMRR), noise, voltage bias loop instability and poor switching performance. Thus, there is a need for a circuit to improve the CMRR, noise switching, and stabilized loop bias for these high resistance heads.

FIG. 1 illustrates a waveform diagram.

SUMMARY OF THE INVENTION

The present invention provides a pre-amp circuit that can be used for high resistance read heads. More particularly, the pre-amp circuit of the present invention eliminates and reduces the problems associated with common mode rejection.

The present invention allows high resistance in the emitter of specific transistors by matching the emitter resistances to be approximately equal. This matching of resistances improves the common mode rejection.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 6:
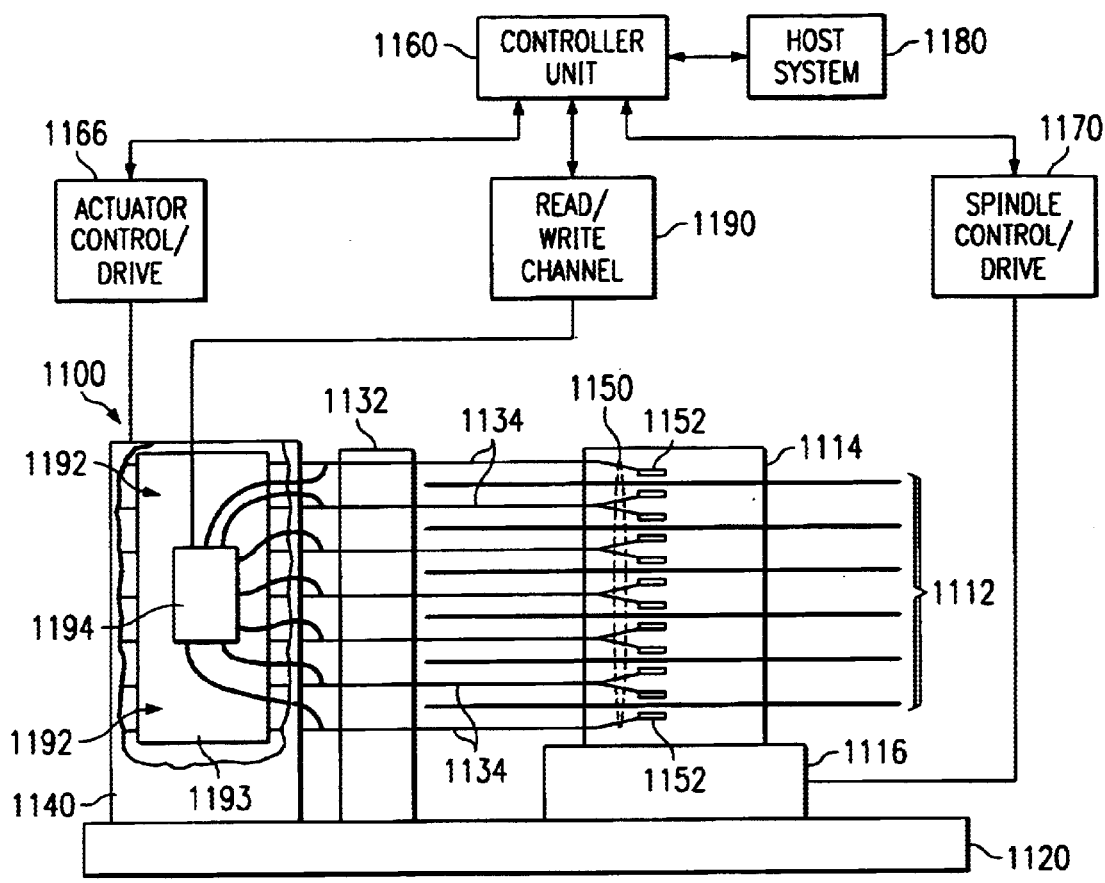
FIG. 6 illustrates a side view of a disk drive system.
Figure 7:
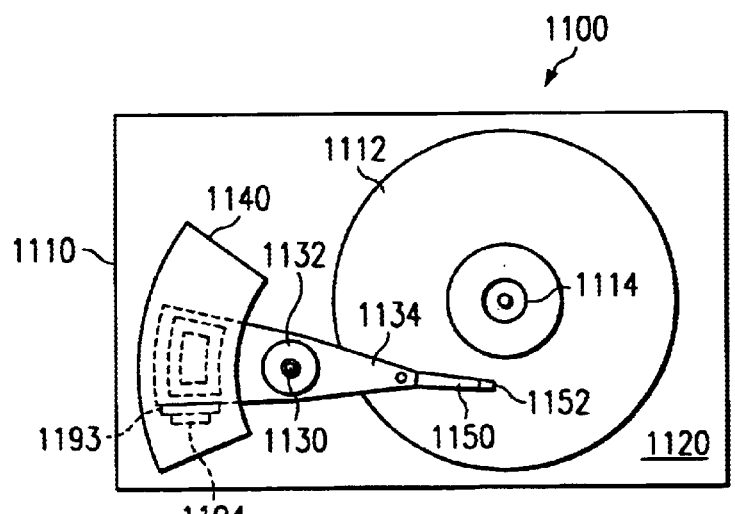
FIG. 7 illustrates a top view of the disk drive system.

FIGS. 6 and 7 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116, which rotates the spindle 1114, and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 1120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166, which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 includes the $R_{MR}$ circuit 200 of the present invention. The AE module 1194 is coupled via connections in the printed circuit board to the read/write channel 1190 and also to each read head and each write head in the plurality of heads 1152.

Figure 1:
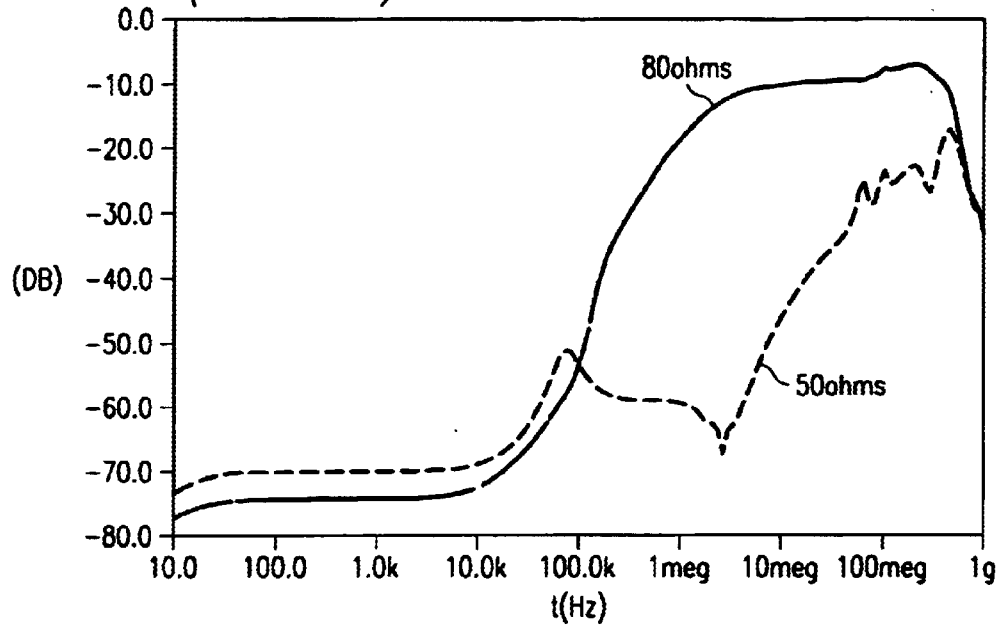
FIG. 1 illustrates a waveform diagram in connection with the prior art.
Figure 2:
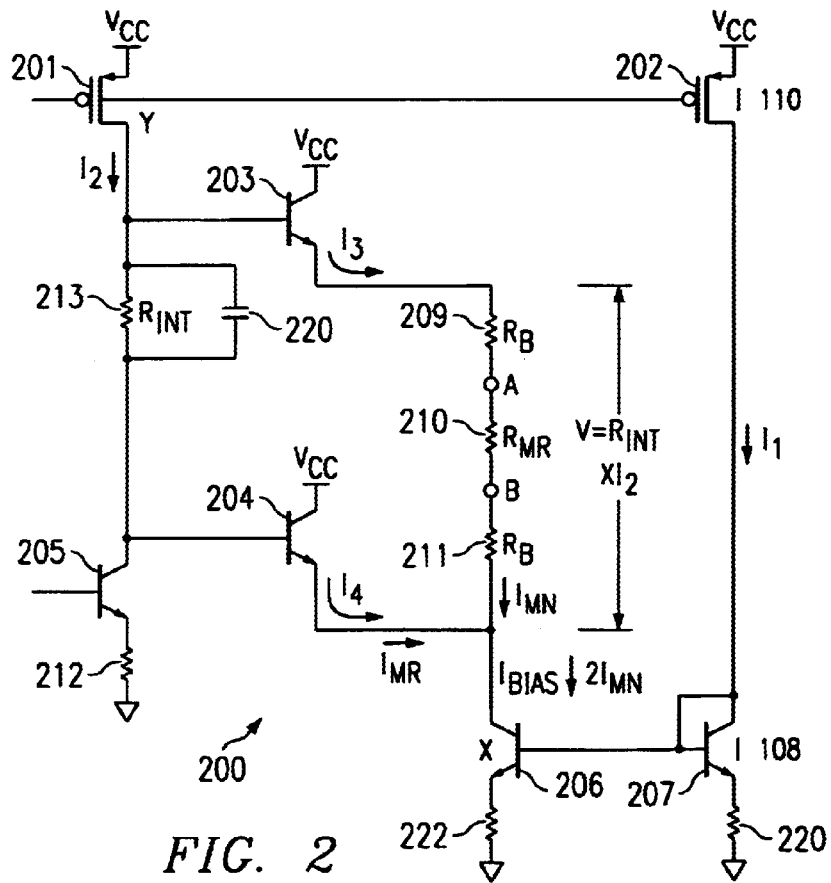
FIG. 2 illustrates an $R_{MR}$ circuit of the present invention.

FIG. 2 illustrates an $R_{MR}$ circuit 200 of the present invention. Turning now to FIG. 2, $R_{MR}$ circuit 200 includes four current paths including a first current path shown by current $I_1$, a second current path shown by current $I_2$, a third path shown by current $I_3$ and a fourth current path shown by current $I_4$. Additionally, $R_{MR}$ circuit 200 includes two current mirrors. The first current mirror includes NPN transistor 206 and NPN transistor 207. The mirrored-ratio is X for this current mirror. A second current mirror is illustrated by PFET 201 and PFET 202 with a current-mirror ratio of Y. The MR head is illustrated as element 210, more specifically as an $R_{MR}$.

The first current path corresponding to current $I_1$ includes PFET 202 having a source connected to voltage $V_{CC}$. The gate of PFET 202 is connected to the gate of PFET 201. The drain of PFET 202 is connected to the collector of NPN transistor 207. The emitter of transistor 207 is connected to resistor 220. The base and collector of transistor 207 are connected together. Additionally, the base of transistor 207 is connected to the base of transistor 206.

Figure 3:
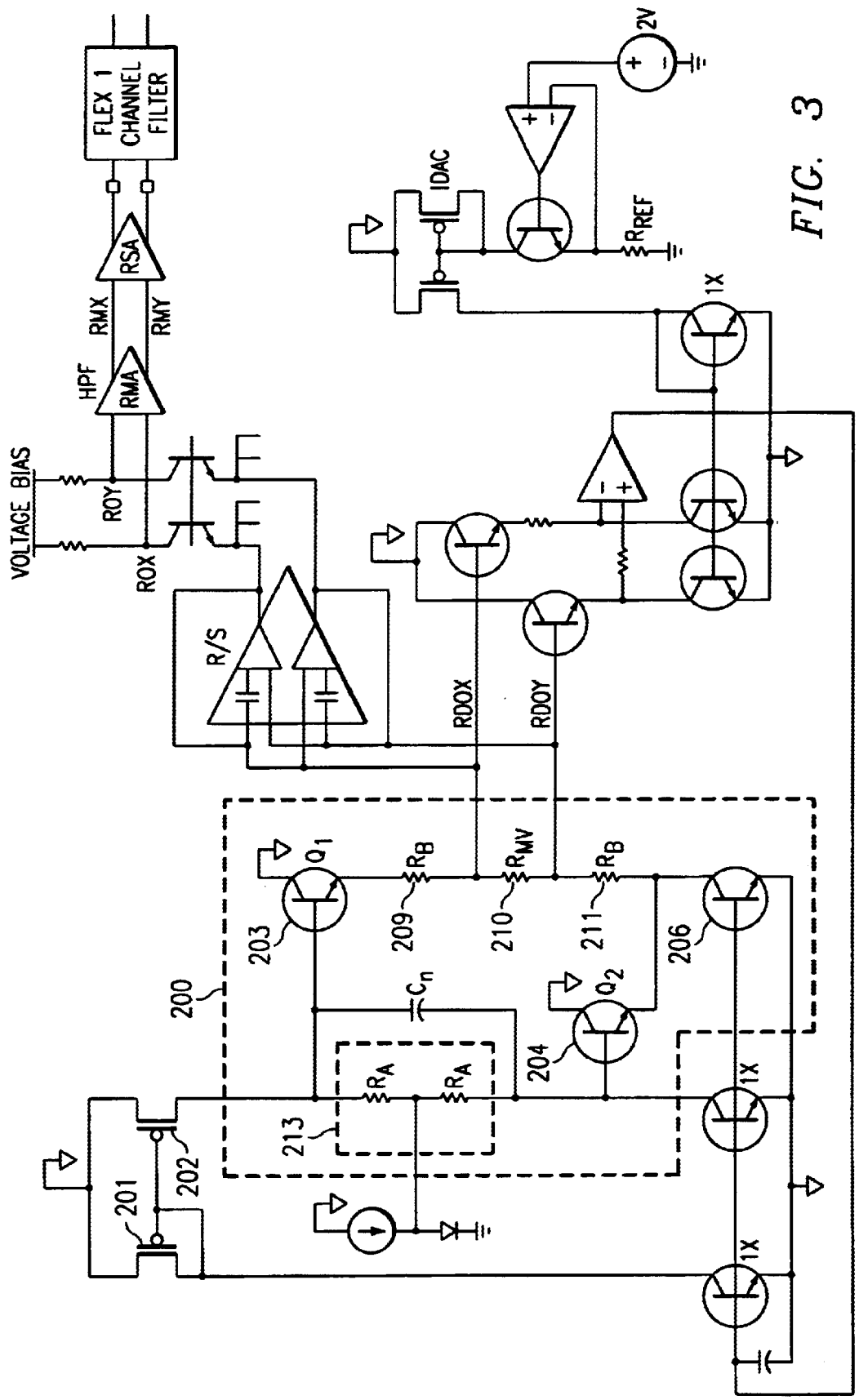
FIG. 3 illustrates a pre-amp circuit using the $R_{MR}$ circuit of the present invention.

The second current path corresponding to current path $I_2$ includes PFET 201, resistor 213, NPN transistor 205 and resistor 212. The source of PFET 201 is connected to voltage $V_{CC}$. The drain of PFET 201 is connected to one end of resistor 213. The other end of resistor 213 is connected to the collector of transistor 205. The base of transistor 205 is connected to the remainder of the pre-amp circuit as illustrated in FIG. 3. The emitter of transistor 205 is connected to one end of resistor 212, and the other end of resistor 212 is connected to voltage $V_{EE}$. A capacitor 220 is connected between the resistor 213 to form a voltage corresponding to the voltage drop across resistor 213.

The third current path corresponding to current $I_3$ includes transistor 203, resistor 209, resistor 210, which is the resistor corresponding the MR head, resistor 211, transistor 206 and resistor 222. The collector of NPN transistor 203 is connected to voltage $V_{CC}$ with the base of transistor 203 being connected to one end of resistor 213. The emitter of transistor 203 is connected to one end of resistor 209. The other end of resistor 209 is connected to resistor 210, which corresponds to the MR head. At the other end of resistor 210 is connected to resistor 211. The other end of resistor 211 is connected to the emitter of transistor 204, and, additionally, the other end of resistor 211 is connected to the collector of transistor 206. The emitter of transistor 206 is connected to resistor 222, which in turn is connected to voltage $V_{EE}$.

The last current path corresponding to the fourth current path $I_4$ includes NPN transistor 204. The base of transistor 204 is connected to the other end of resistor 213 with the collector of transistor 204 connected to voltage $V_{CC}$. The emitter of transistor 204 is connected between resistor 211 and the collector of transistor 206. The voltage drop across resistor 209, resistor 210 and resistor 211 is equal to the resistance of resistor 213 times the current $I_2$. This is true because of the connection of transistor 203 and transistor 204. Thus, the current $I_3$ is equal to the resistance $R_{213}$ times current $I_2$ divided by the sum of resistance from resistors 209, 210 and 211. With the ratios 'x' and 'y' chosen correctly, the current supplied by transistor 206 can be set to be equal to $2I_3$. Since the current through transistor 206 is equal to $I_3+I_4$, then $I_3=I_4$. Thus, the current $I_3$ is equal to the current $I_4$ namely current $I_{MR}$ which is the current through the MR head. Thus, since the same current flows through transistor 203 and transistor 204, the emitter resistance of the respective transistors 203 and 204 are the same, resulting in a low common mode rejection. Thus, the MR head can have a higher resistance (the resistance of resistor 210), which decreases current. The decreased $I_{MR}$ current increases the emitter resistance of transistor 203 and transistor 204. Thus, mismatches between the emitter resistance of transistor 203 and transistor 204 are more pronounced. But because of the equal emitter resistors of transistor 203 and transistor 204 from the equal emitter current, the common mode rejection is large. The following equations apply:

$$I_3 = xI_1 = \frac{x}{y}I_2$$

$$2I_3 = \frac{x}{y}I_2 \qquad \text{eq. 1}$$

$$I_3 = \frac{I_2 R_{213}}{2R_{209} + R_{210}} \qquad \text{eq. 2}$$

$$\frac{x}{y} = \frac{2R_{213}}{2R_{209} + R_{210}}$$

FIG. 3 illustrates a pre-amp circuit with the MR circuit of the present invention.

Figure 4:
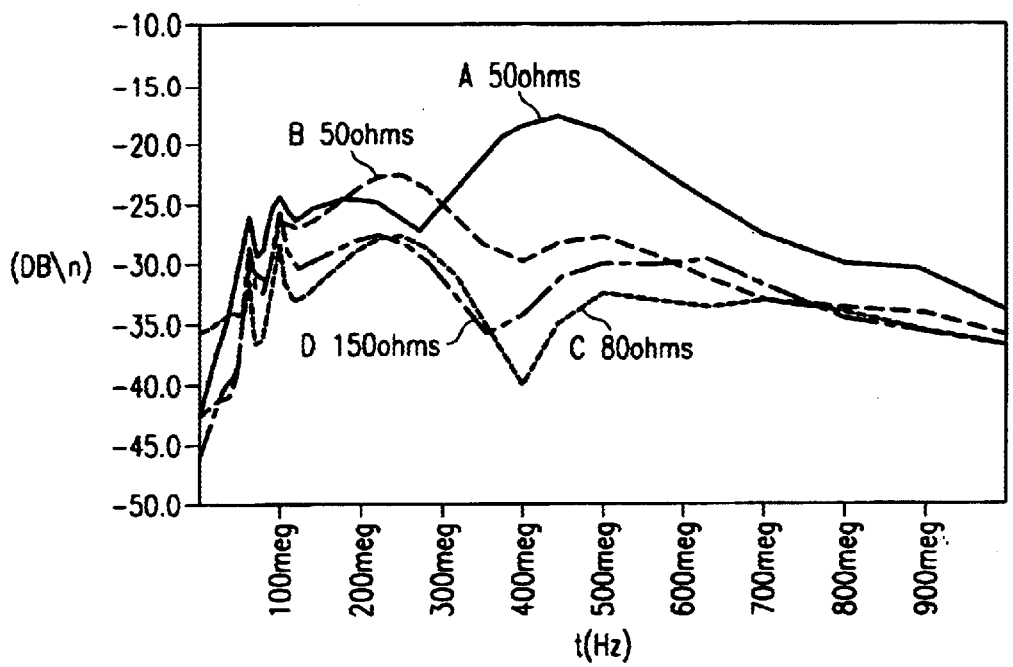
FIG. 4 illustrates a waveform diagram illustrating the advantages of the present invention.
Figure 5:
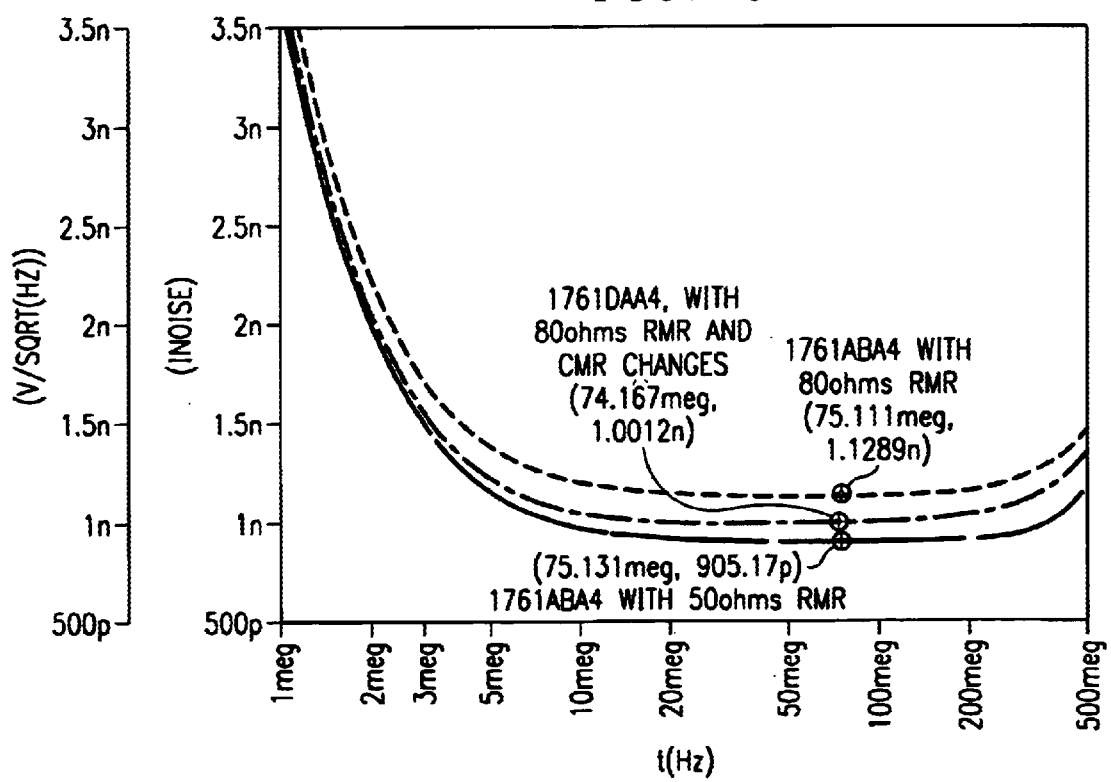
FIG. 5 illustrates a input noise diagram illustrating the advantages of the present invention.

FIG. 4 illustrates the graph of the present invention, plotting noise against frequency. The curve A illustrates a 50-ohm MR head used with the circuit of the prior art. The curve B illustrates a 50-ohm MR head used with the MR circuit of the present invention. Curve C illustrates an MR head of 80 ohms, and curve D illustrates an MR head of 150 ohm. Curves B, C and D show a significant improvement over curve A especially in the higher frequency ranges. FIG. 5 illustrates the noise response.

What is claimed is:

1. A differential circuit to read differential data from a disk by a voltage bias on a read head, comprising:
   a read circuit to read said differential data from said disk by maintaining said voltage bias on said read head by a first transistor and a second transistor;
   said first transistor being positioned in a first current path to maintain a first current; and
   said second transistor being positioned in a second current path to maintain a second current,
   wherein said first current is approximately equal to said second current.

2. A differential circuit, as in claim 1, wherein said first current path includes a resistor corresponding to a MR head.

3. A differential circuit, as in claim 1, wherein said first transistor and said second transistor are connected between a common resistor.

4. A differential circuit, as in claim 1, wherein said read head is a MR read head.

5. A differential circuit to read differential data from a disk by a voltage bias on a read head, comprising:
   a read circuit to read said differential data from said disk by maintaining said voltage bias on said read head by a first transistor and a second transistor;
   said first transistor being positioned in a first current path to maintain a first current; and
   said second transistor being positioned in a second current path to maintain a second current,
   wherein said first current is approximately equal to said second current, and
   wherein said read head has a resistance between 50 and 150 ohms.

6. A disk system to read information from a disk, comprising:
   a read/write head to read and write information from said disk;
   a read channel to process said information; and
   a differential circuit to read differential data from a disk by a voltage bias, comprising:
      a read circuit to read said differential data from said disk by maintaining said voltage by a first transistor and a second transistor;
      said first transistor being positioned in a first current path to maintain a first current;
      said second transistor being positioned in a second current path to maintain a second current; and
      wherein said first current is approximately equal to said second current.

7. A disk system, as in claim 6, wherein said first current path includes a resistor corresponding to a MR head.

8. A disk system, as in claim 6, wherein said first transistor and said second transistor are connected between a common resistor.

9. A disk system, as in claim 6, wherein said read head is a MR read head.

10. A disk system to read information from a disk, comprising:
    a read/write head to read and write information from said disk;
    a read channel to process said information; and
    a differential circuit to read differential data from a disk by a voltage bias, comprising:
       a read circuit to read said differential data from said disk by maintaining said voltage by a first transistor and a second transistor;
       said first transistor being positioned in a first current path to maintain a first current;
       said second transistor being positioned in a second current path to maintain a second current; and
       wherein said first current is approximately equal to said second current, and
       wherein said read head has a resistance between 50 and 150 ohms.

* * * * *